United States Patent

Oyama et al.

[11] Patent Number: 5,855,976
[45] Date of Patent: Jan. 5, 1999

[54] LAMINATE OF VULCANIZABLE RUBBER COMPOSITION LAYERS, PROCESS FOR PRODUCING RUBBER LAMINATE, AND RUBBER LAMINATE

[75] Inventors: Motofumi Oyama, Kanagawa; Kazuyoshi Nakajima, Tokyo, both of Japan

[73] Assignee: Nippon Zeon Co., Ltd., Tokyo, Japan

[21] Appl. No.: 676,402

[22] PCT Filed: Jan. 24, 1995

[86] PCT No.: PCT/JP95/00078

§ 371 Date: Jul. 23, 1996

§ 102(e) Date: Jul. 23, 1996

[87] PCT Pub. No.: WO95/19880

PCT Pub. Date: Jul. 27, 1995

[30] Foreign Application Priority Data

Jan. 24, 1994 [JP] Japan ................................ 6-021835

[51] Int. Cl.$^6$ .............................. B32B 1/08; B32B 25/04; B32B 25/14; B32B 25/16
[52] U.S. Cl. .................... 428/36.6; 428/328; 428/330; 428/421; 428/515; 428/519; 428/520; 428/521; 428/522; 525/194; 525/195; 525/233; 525/235; 525/238; 525/239; 525/326.3; 525/329.1; 525/329.2; 525/329.3; 525/331.4; 525/331.5; 156/307.1; 277/227; 277/228; 277/229
[58] Field of Search ................................. 428/35.7, 35.6, 428/36.8, 36.9, 36.91, 421, 422, 323, 328, 330, 329, 522, 515; 156/307.1; 525/238, 239, 233, 235, 194, 236.3, 329.1, 329.2, 329.3, 195; 526/341, 342, 242, 250, 253, 254, 255

[56] References Cited

U.S. PATENT DOCUMENTS 4,048,261  9/1977  Starmer .................................. 260/888
4,606,952  8/1986  Sugimoto et al. ........................ 428/36
4,792,581  12/1988 Kondo et al. ............................ 524/523
4,806,351  2/1989  Sugimoto et al. ....................... 428/421
4,828,923  5/1989  Nakagawa et al. ...................... 428/422
4,887,647  12/1989 Igarashi et al. ........................ 138/126
5,068,137  11/1991 Ozawa et al. .......................... 428/36.2
5,077,108  12/1991 Ozawa et al. .......................... 428/36.2
5,187,232  2/1993  Musch et al. .......................... 525/215
5,378,543  1/1995  Murata et al. ......................... 428/517
5,588,469  12/1996 Kakiuchi et al. ....................... 138/137

Primary Examiner—Vivian Chen
Attorney, Agent, or Firm—Armstrong, Westerman, Hattori, McLeland & Naughton

[57] ABSTRACT

A laminate of vulcanizable rubber composition layers, which comprises (i) a vulcanizable fluororubber composition layer comprising a fluororubber and a metal oxide and (ii) a vulcanizable nitrile rubber composition layer consisting essentially of a nitrile rubber, an organic phosphonium salt of the following formula (1), an organic peroxide crosslinking system, and an organic basic vulcanization accelerator:

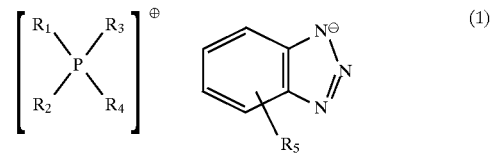

wherein $R_1$, $R_2$, $R_3$ and $R_4$ are hydrocarbyl, and no more than three thereof may be amino or fluoroalkyl; and $R_5$ is hydrogen or alkyl. A vulcanized laminate made of the vulcanizable rubber composition layers is useful for a fuel hose or a diaphragm.

26 Claims, No Drawings

LAMINATE OF VULCANIZABLE RUBBER COMPOSITION LAYERS, PROCESS FOR PRODUCING RUBBER LAMINATE, AND RUBBER LAMINATE

This application is a 371 of PCT/JP95/00078, filed Jan. 24, 1995.

TECHNICAL FIELD

This invention relates to a laminate of vulcanizable rubber composition layers, which comprises a vulcanizable fluororubber composition layer and a vulcanizable nitrile rubber layer, a process for producing a rubber laminate from the laminate of vulcanizable rubber composition layers, and a rubbery material comprising the rubber laminate.

BACKGROUND ART

Nitrile rubbers represented by an acrylonitrile-butadiene copolymer rubber (hereinafter referred to as "NBR" when appropriate) have heretofore been used for fuel hoses for automobiles. Recently importance is placed on the resistance of fuel hoses to sour-gasoline and alcohol-mixed gasoline. A mixture of NBR with polyvinyl chloride (hereinafter referred to as "polyblend" when appropriate) is used as a rubber material for an inlet filler hose for which a good sour-gasoline resistance is required, and fluororubber is used as a rubber material for an inlet filler hose for which a good alcohol-mixed gasoline resistance is required.

Fluororubber has good thermal resistance, oil resistance, solvent resistance and chemical resistance, but is relatively expensive as compared with other rubbers and has a poor cold resistance. To cope with the deficiency of fluororubber, attention is attracted to a rubber laminate comprising a fluororubber composition layer and another rubber composition layer.

A laminate of a fluororubber composition layer and a nitrile rubber composition layer, made by a conventional laminating procedure, has a problem such that the adhesion between the two rubber composition layers is poor. To enhance the adhesion, various proposals have heretofore been made. For example, a method has been proposed wherein a fluororubber composition layer having incorporated therein a polyol vulcanizer and a metal oxide is adhered to a nitrile rubber composition layer having incorporated therein a sulfur-containing vulcanizer and tetrabutylphosphonium benzotriazolate, which is a special salt made from an organic phosphonium compound and a benzotriazolate compound (Japanese Unexamined Patent Publication No. 63-252736). This method has a problem such that the nitrile rubber composition layer containing a sulfur-containing vulcanizer tends to scorch during processing operation, i.e., the rubber composition is subject to a premature cure during processing operation before the vulcanization step, and consequently vulcanization and other operations become . difficult.

To solve the scorch problem, a proposal of incorporating an organic peroxide crosslinking system and a sulfenamide compound into the nitrile rubber composition layer containing tetrabutylphosphonium benzotriazolate has been made (Japanese Unexamined Patent Publication No. 1-110141). The problem of scorch can be solved by this proposal, but, to enhance the adhesion between the fluororubber composition layer and the nitrile rubber composition layer, a salient amount of calcium hydroxide must be incorporated in the nitrile rubber composition layer, with the results that thermal aging resistance of the fluororubber/nitrile rubber laminate is reduced and an adverse influence is exerted on the balanced properties including a permanent set of the vulcanized product.

DISCLOSURE OF INVENTION

An object of the present invention is to provide a laminate of rubber composition layers, which comprises a vulcanizable fluororubber composition layer and a vulcanizable nitrile rubber composition layer, and which is made by a process wherein undesirable scorch does not occur in the step of adhering the two rubber composition layers simultaneously with vulcanization, and thus, vulcanization proceeds stably with the result of a fluororubber/nitrile rubber laminate having a good thermal aging resistance.

Another object of the present invention is to provide a process by which the above-mentioned fluororubber/nitrile rubber laminate having a good thermal aging resistance can be advantageously produced.

Still another object of the present invention is to provide a rubbery material comprising the above-mentioned fluororubber/nitrile rubber laminate having good properties.

In one aspect of the present invention, there is provided a laminate of vulcanizable rubber composition layers, which comprises (i) a layer of a vulcanizable fluororubber composition comprising fluororubber and a metal oxide and (ii) a layer of a vulcanizable nitrile rubber composition comprising a nitrile rubber, an organic phosphonium salt represented by the following formula (1), an organic peroxide crosslinking system, and an organic basic vulcanization accelerator:

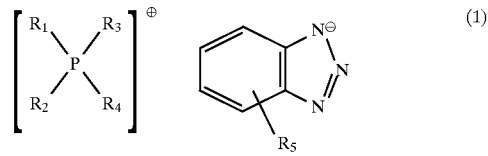

wherein $R_1$, $R_2$, $R_3$ and $R_4$ each represents a hydrocarbon group having 1 to 20 carbon atoms, which may have a substituent, and no more than three of $R_1$, $R_2$, $R_3$ and $R_4$ may be a primary, secondary or tertiary amino group or a fluoroalkyl group; and $R_5$ represents hydrogen or an alkyl group having 1 to 20 carbon atoms.

In another aspect of the present invention, there is provided a process for producing a rubber laminate which comprises adhering together the vulcanizable rubber composition layers in the above-mentioned laminate under vulcanizing conditions.

In still other aspects of the present invention, there are provided a material for a fuel hose or a diaphragm which comprises the above-mentioned rubber laminate; and a fuel hose and a diaphragm, which are made of the above-mentioned laminate.

BEST MODE FOR CARRYING OUT THE INVENTION

The vulcanizable fluororubber composition layer constituting the vulcanizable rubber laminate of the present invention comprises fluororubber and 1 to 30 parts by weight, based on 100 parts by weight of the fluororubber, of a metal oxide. The fluororubber composition further comprises a vulcanizer which may be conventional for fluororubber. The fluororubber is a polymer rubber of a fluorine-containing unsaturated monomer or a copolymer rubber of a fluorine-containing unsaturated monomer and other copolymerizable monomer. As specific examples of the fluorine-containing unsaturated monomer, there can be mentioned vinylidene fluoride, hexafluoropropylene, tetrafluoroethylene, pentafluoropropylene, trifluoroethylene, trifluorochloroethylene, vinyl fluoride, perfluoromethyl vinyl ether and perfluoroethyl vinyl ether. As preferable examples of the fluororubber, there can be mentioned a copolymer of vinylidene fluoride and hexafluoropropylene, and a terpolymer of vinylidene fluoride, hexafluoropropylene and tetrafluoroethylene.

The metal oxide contained in the fluororubber composition layer is usually used as an ingredient in a vulcanization system for fluororubber and is selected from oxides of metals of group 2A, group 3B and group 4B of the periodic table. As examples of the metal oxide, there can be mentioned oxides of group 2A metals such as calcium oxide, magnesium oxide and barium oxide, oxides of group 3B metals such as aluminum oxide, and oxides of group 4B metals such as trilead tetroxide. Of these metal oxides, magnesium oxide is most preferable.

As the vulcanizer conventionally used for fluororubber, there can be mentioned a polyol vulcanizer, a polyamine vulcanizer and an organic peroxide vulcanizer. The polyol vulcanizer includes, for example, quaternary ammonium salts and organic phosphine compounds. A vulcanization accelerator such as an aromatic diol, e.g., dihydroxybenzophenone or hexafluoroisopropylidene bisphenol is used in combination with the polyol vulcanizer. The polyamine vulcanizer includes, for example, hexamethylenediamine carbamate and ethylenediamine carbamate. The organic peroxide vulcanizer includes, for example, benzoyl peroxide and dicumyl peroxide. The amount of the vulcanizer is not particularly limited, but is usually 1 to 10 parts by weight based on 100 parts by weight of the fluororubber.

The vulcanizable nitrile rubber composition layer constituting the vulcanizable rubber laminate of the present invention comprises a nitrile rubber, an organic phosphonium salt and an organic peroxide crosslinking system. The nitrile rubber used is a copolymer rubber of an unsaturated nitrile monomer and a conjugated diene monomer, preferably having a bound unsaturated nitrile content of 20 to 60% by weight and a Mooney viscosity of 20 to 95. As specific examples of the unsaturated nitrile monomer, there can be mentioned 1,3-butadiene, 2,3-dimethylbutadiene, isoprene and 1,3-pentadiene.

If desired, provided that the intended effect of the present invention is obtained, part of the monomers used may be substituted by other copolymerizable monomers. As specific examples of the copolymerizable monomers, there can be mentioned vinyl monomers such as styrene, α-methylstyrene and vinylpyridine; non-conjugated diene monomers such as vinylnorbornene, dicyclopentadiene and 1,4-hexadiene; alkyl acrylates, alkyl methacrylates, alkoxyalkyl acrylates, alkoxyalkyl methacrylates and hydroxyalkyl acrylates; and esters of unsaturated dicarboxylic acids such as monoalkyl esters of unsaturated dicarboxylic acids and dialkyl esters of unsaturated dicarboxylic acids.

Of the nitrile rubbers, an acrylonitrile-butadiene copolymer rubber (NBR) having a bound acrylonitrile content of 20 to 60% by weight is most preferable. A broad range of commercially available copolymers spanning from those having a low bound nitrile content to those having a very high bound nitrile content can be used. An NBR with an optimum bound acrylonitrile content is selected depending upon the particular properties required.

As the nitrile rubber, a nitrile group-containing highly saturated copolymer rubber can also be used which is a hydrogenation product obtained by hydrogenating the conjugated diene monomer units of the above-mentioned unsaturated nitrile-conjugated diene copolymer. As the nitrile group-containing highly saturated copolymer rubber, those which have an iodine value of 0 to 120, especially 5 to 100 are preferably used in view of the thermal resistance and the sour-gasoline resistance.

As the vulcanizable nitrile rubber composition layer, a layer of the above-mentioned vulcanizable nitrile rubber composition having incorporated therein polyvinyl chloride can also be used. The polyvinyl chloride-containing nitrile rubber composition has an enhanced weather resistance. The polyvinyl chloride used is not particularly limited, and those having an average molecular weight of 600 to 2,000 are usually used. The amount of the nitrile rubber is usually 95 to 50 parts by weight, preferably 80 to 60 parts by weight and the amount of the polyvinyl chloride is usually 5 to 50 parts by weight, preferably 20 to 40 parts by weight.

A mixture of an unsaturated nitrile/conjugated diene copolymer rubber, especially NBR, and polyvinyl chloride is preferable (which mixture is hereinafter referred to as "polyblend" when appropriate). Especially a polyblend composed of 70 parts by weight of NBR and 30 parts by weight of polyvinyl chloride is most preferable. The method by which the polyblend is prepared is not particularly limited, and usually there are adopted a dry-blending method wherein NBR and powdery polyvinyl chloride are mixed together at a high temperature by a mixer such as a Banbury mixer, and a latex-coprecipitating method wherein NBR and polyvinyl chloride resin are mixed together in a latex state, the mixed latex is coagulated and dried, and then heat-treated by using, for example, an extruder or a Banbury mixer. The polyblend exhibits good ozone resistance and reduced permanent set, and therefore is useful especially as an outer layer of a fuel hose.

The organic phosphonium compound used in the present invention is a special salt of an organic phosphonium compound with a benzotriazolate, which is represented by the following formula (1):

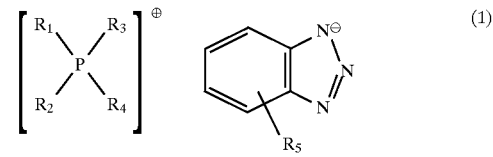

wherein $R_1$, $R_2$, $R_3$ and $R_4$ each represents a hydrocarbon group having 1 to 20 carbon atoms, which may have a substituent, and no more than three of $R_1$, $R_2$, $R_3$ and $R_4$ may be a primary, secondary or tertiary amino group or a fluoroalkyl group; and $R_5$ represents hydrogen or an alkyl group having 1 to 20 carbon atoms.

As specific examples of the hydrocarbon group having 1 to 20 carbon atoms constituting $R_1$, $R_2$, $R_3$ and $R_4$, there can be mentioned an alkyl group such as methyl, ethyl, butyl, ethylhexyl or dodecyl, an cycloalkyl group such as cyclohexyl, an aralkyl group such as benzyl or methylbenzyl, and an aryl group or substituted aryl group such as phenyl, naphthyl or butylphenyl. As specific examples of the secondary or tertiary amino group, there can be mentioned methylamino, ethylamino, anilino, dimethylamino and diethylamino. As specific examples of the fluoroalkyl group, there can be mentioned trifluoromethyl, tetrafluoropropyl and octafluoropentyl. As specific examples of $R_5$, there can be mentioned an alkyl group such as methyl, ethyl, butyl, ethylhexyl or dodecyl.

As specific examples of the organic phosphonium salt of formula (1), there can be mentioned benzotriazolate compounds such as tetrabutylphosphonium benzotriazolate, tetraoctylphosphonium benzotriazolate, methyltrioctylphosphonium benzbtriazolate, butyltrioctylphosphonium benzotriazolate, phenyltributylphosphonium benzotriazolate, benzyltributylphosphonium benzotriazolate, benzyltricyclohexylphosphonium benzotriazolate, benzyltrioctylphosphonium benzotriazolate, butyltriphenylphosphonium benzotriazolate, octyltriphenylphosphonium benzotriazolate, benzyltriphenylphosphonium benzotriazolate, tetraphenylphosphonium benzotriazolate, diphenyldi(diethylamino)phosphonium benzotriazolate, phenylbenzyldi(dimethylamino)phosphonium benzotriazolate, phenylbenzyldi(diethylamino) phosphonium benzotriazolate, trifluoromethylbenzylphosphonium benzotriazolate, tetrafluoropropyltrioctylphosphonium benzotriazolate and phosphonium tolyltriazolate.

The amount of the organic phosphonium salt is not particularly limited, but is usually in the range of 0.5 to 10 parts by weight, preferably 2.5 to 5 parts by weight, based on 100 parts by weight of the nitrile rubber. If the amount is smaller than 0.5 part by weight, the laminate has a poor adhesion between the rubber layers. In contrast, the amount is larger than 10 parts by weight, the vulcanization rate of the nitrile rubber is drastically reduced.

Provided that the intended effect of the present invention is achieved, a halogen-containing organic phosphonium salt or a halogen-containing organic ammonium salt can be used in combination with the organic phosphonium salt of formula (1). As specific examples of the halogen-containing organic phosphonium salt, there can be mentioned tetramethylphosphonium chloride, tetraethylphosphonium chloride, tetrapropylphosphonium chloride, tetra-n-butylphosphonium chloride, tri-n-butylhexadecylphosphonium chloride, tri-n-butylbenzylphosphonium chloride, tri-n-octylethylphosphonium chloride, tetramethylphosphonium bromide, tetraethylphosphonium bromide, tetrapropylphosphonium bromide, tetran-butylphosphonium bromide, tri-n-butylhexadecylphosphonium bromide, tri-n-butylbenzylphosphonium bromide and tri-n-octylethylphosphonium bromide. As specific examples of the halogen-containing organic ammonium salt, there can be mentioned tetramethylammonium chloride, tetraethylammonium chloride, tetrapropylammonium chloride, tetra-n-butylammonium chloride, tri-n-butyl-hexadecylammonium chloride, tri-n-butylbenzylammonium chloride, tri-n-octylethylammonium chloride, tetramethylammonium bromide, tetraethylammonium bromide, tetrapropylammonium bromide, tetra-n-butylammonium bromide, tri-n-butylhexadecylammonium bromide, tri-n-butylbenzylammonium bromide and tri-n-octylethylammonium bromide.

The organic peroxide crosslinking system used in the present invention comprises an organic peroxide crosslinking agent and a crosslinking aid, which may be the same as those conventionally used in the rubber industry and the plastic industry. As specific examples of the organic peroxide crosslinking agent, there can be mentioned dicumyl peroxide, di-t-butyl peroxide, t-butylcumyl peroxide, benzoyl peroxide, 2,4-dichlorodibenzoyl peroxide, 2,5-dimethyl-2,5-di(t-butylperoxy)hexyne-3, 1,1-di-(t-butylperoxy)-3,3,5-trimethylcyclohexane, t-butylperoxybenzoate, 2,5-dimethyl-2,5-di(benzoylperoxy) hexane, and 1,3-di(t-butylperoxyisopropyl)benzene.

As the crosslinking aid, compounds having unsaturated bonds in the molecule which are conventionally used in organic peroxide crosslinking are used. As specific examples thereof, there can be mentioned polyfunctional monomers such as triallyl cyanurate, triallyl isocyanurate, trimethylolpropane trimethacrylate, ethylene dimethacrylate, divinylbenzene, diallyl phthalate, toluylene bismaleimide and metaphenylene bismaleimide, and liquid polybutadiene. The amounts of the organic peroxide crosslinking agent and the crosslinking aid are 0.5 to 10 parts by weight and 1 to 5 parts by weight, respectively, based on 100 parts by weight of the nitrile rubber.

When a basic vulcanization accelerator is used in combination with the organic peroxide crosslinking system in the vulcanizable nitrile rubber composition layer, the amount of calcium hydroxide to be incorporated in the nitrile rubber layer for enhancement of adhesion can be reduced. In contrast, a salient amount of calcium hydroxide must be incorporated in the conventional nitrile rubber layer. The reduction of the amount of calcium hydroxide leads to enhancement of the heat aging resistance and reduction of the permanent set. The basic vulcanization accelerator used is classified as an organic vulcanization accelerator usually used for sulfur vulcanization. As specific examples of the basic vulcanization accelerator, there can be mentioned an aldehyde-ammonia vulcanization accelerator which is a reaction product of an aliphatic aldehyde with ammonia, an aldehyde-amine vulcanization accelerator which is a reaction product of an aliphatic aldehyde with an aliphatic or aromatic amine, and a guanidine vulcanization accelerator.

As specific examples of the aldehyde-ammonia vulcanization accelerator, there can be mentioned hexamethylene tetramine, an acetaldehyde-ammonia reaction product and an ethyl chloride-formaldehyde-ammonia reaction product. As specific examples of the aldehyde-amine vulcanization accelerator, there can be mentioned a formaldehyde-p-toluidine condensation product, an acetaldehyde-aniline reaction product, an n-butylaldehyde-aniline reaction product, a butylaldehyde-acetaldehyde-aniline reaction product, a butylaldehyde-monobutylamine reaction product, a butylaldehyde-butylideneaniline reaction product, a heptaldehyde-aniline reaction product, a tricrotonylideneaniline reaction product, an α-ethyl-β-propylacroleinaniline condensation product, homologous acrolein-aromatic base condensation products, a formaldehyde-aniline condensation product, a formaldehyde-acetaldehyde-aniline condensation product, an acetaldehyde-paratoluidine condensation product and aldehyde-amine mixed condensation products. As specific examples of the guanidine vulcanization accelerator, there can be mentioned diphenylguanidine, di-o-toluylguanidine, o-toluylbiguanide, dicatechol, di-o-toluylguanidine borate, diphenylguanidine phthalate, a diarylguanidine mixture, phenyltolylsilylguanidine and diphenylguanidine acetate.

Of these basic organic vulcanization accelerators, guanidine vulcanization accelerators are preferable, and diphenylguanidine is most preferable. The amount of the basic organic vulcanization accelerator is not particularly limited, but is usually, in the range of 0.1 to 5 parts by weight, preferably,0.5 to 2 parts by weight, based on 100 parts by weight of the nitrile rubber.

If desired, an oxide or hydroxide of a metal selected from those of group 2 to group 4 of the periodic table can be incorporated in the vulcanizable nitrile rubber composition layer. By incorporating smaller than 5% by weight, more preferably 0.5 to 3 parts by weight, based on 100 parts by weight of the nitrile rubber, of the metal oxide or hydroxide, the thermal resistance and permanent set of the laminate are improved and the cold resistance thereof is much enhanced, without substantial reduction of adhesion between the rubber layers. As specific examples of the metal oxide and hydroxide, there can be mentioned magnesium oxide, aluminum oxide, zinc oxide, zinc dioxide, calcium oxide, trilead tetroxide, aluminum hydroxide and calcium hydroxide. Of these, magnesium oxide, zinc oxide and calcium hydroxide are preferable.

If desired, the vulcanizable fluororubber composition layer and the vulcanizable nitrile rubber composition of the vulcanizable rubber laminate of the present invention have incorporated therein other ingredients, for example, a reinforcer such as carbon black or silica, a filler, a softener, a plasticizer, an age stabilizer, a stabilizer and a processing aid.

The laminate of the present invention comprising a vulcanizable fluororubber composition layer and a vulcanizable nitrile rubber composition layer can be made into a vulcanized rubber laminate by adhering the vulcanizable fluororubber composition layer and a vulcanizable nitrile rubber composition layer to each other under vulcanizing conditions. The procedure of conducting adhesion simultaneously with vulcanization is not particularly limited, but the following procedure is usually employed. A vulcanizable fluororubber composition comprising fluororubber, a metal oxide, a vulcanizer, for fluororubber and other additives, and a vulcanizable nitrile rubber composition comprising a nitrile rubber, the organic peroxide salt, an organic phosphonium crosslinking system and other additives are separately kneaded by a conventional procedure, and each formed into a vulcanizable rubber composition layer of a desired thickness. The two rubber composition layers in an unvulcanized state are placed in contact with each other and adhered simultaneously with vulcanization by using a hot press or a vulcanizer whereby a rubber laminate comprising the vulcanized fluororubber layer and the vulcanized nitrile rubber layer is formed. Alternatively, the two vulcanizable rubber composition layers are extruded into a tubular laminate by a two-layer extrusion method and then the tubular extrudate is subjected to adhesion simultaneously with vulcanization by using a vulcanizer. When a hot-press is used, the vulcanization is conducted usually at a temperature of 140° to 200° C. under a pressure of 20 to 150 kg/cm² for 5 to 60 minutes. When a vulcanizer is used, the vulcanization is conducted usually at a temperature of 130° to 160° C. under a pressure of 1.8 to 5.5 kg/cm² for 30 to 120 minutes. The thus-formed rubber laminate can be post-cured under heated conditions to shorten the time of primary vulcanization and further reduce the permanent set.

A fuel hose having good weather resistance and gasoline resistance can be formed from the rubber laminate of the present invention by using this rubber laminate as an inner rubber tubular layer in combination with a fiber-reinforcing layer and an outer rubber tubular layer. The procedure by which the fuel hose is made is not particularly limited, but the fuel hose is usually made by the following procedure. The vulcanizable fluororubber composition and the vulcanizable nitrile rubber composition are extruded together by a two-layer extrusion method into a tubular laminate tube which forms an inner tube of the fuel tube and composed of an inner-side vulcanizable fluororubber composition layer and an outer-side vulcanizable nitrile rubber composition layer. A fibrous-reinforcing material such as polyester filament yarn is knitted by braiding at an appropriate knit angle on the tubular laminate of the vulcanizable rubber composition layers to form a reinforcing fiber layer, and then a vulcanizable rubber composition comprising, for example, epichlorohydrin rubber is extruded by an extrusion lamination method on the outer periphery of the braid reinforcement layer to form an unvulcanized rubber hose. Then a metal mandrel is inserted into the unvulcanized rubber hose by applying a compressed air, the unvulcanized rubber hose is vulcaniazed by steam vulcanization, the metal mandrel is drawn from the vulcanized rubber hose, and the hose is then washed and heat-treated to yield a fuel hose.

A diaphragm can be made from the rubber laminate of the present invention. The procedure by which the diaphragm is made is not particularly limited, but the following procedure is usually employed. The vulcanizable fluororubber composition and the vulcanizable nitrile rubber composition are separately rolled into sheets. The sheets are blanked and then superposed upon another. The superposed rubber composition sheets are superposed on a base fabric layer, and the superposed rubber sheets and base fabric layer are press-molded at a temperature of 150° to 190° C. under a pressure of 50 to 150 kgf/cm² for 3 to 30 minutes to effect adhesion simultaneously with vulcanization to yield a diaphragm.

The invention will now be specifically described by the following examples. In the following examples and comparative examples, parts and % are by weight unless otherwise specified.

EXAMPLES 1 to 4 AND COMPARATIVE EXAMPLES 1 TO 6

Each of the vulcanizable nitrile rubber composition shown in Table 1 and the vulcanizable fluororubber composition shown in Table 2 was kneaded together by a 6 inch open roll to form a sheet having a uniform thickness of about 2 mm. The physical properties of a vulcanized product of the nitrile rubber composition sheet were evaluated. The results are shown in Table 3. Each sheet was cut into a size of 6 cm×10 cm, and two sheets were adhered to each other and simultaneously vulcanized at 170° C. under a press pressure of 40 kg/cm² for 15 minutes to form a rubber laminate. A peel test of the laminate was conducted according to JIS K6301 at a pulling rate of 50 mm/min, wherein cellophane was inserted in the portions gripped by chucks so that the two rubber sheets did not stick to each other, and the bond strength (unit: kgf/cm) and broken state of the laminate were evaluated. The results are shown in Table 3.

TABLE 1

| | Vulcaniazable Nitrile Rubber Composition | | | | | | | | | |
|---|---|---|---|---|---|---|---|---|---|---|
| | Example | | | | Comparative Example | | | | | |
| | 1 | 2 | 3 | 4 | 1 | 2 | 3 | 4 | 5 | 6 |
| NBR *1 | 100 | — | — | — | 100 | — | — | — | — | — |
| Polyblend *2 | — | 100 | 100 | 100 | — | — | — | 100 | — | — |
| Zinc oxide | 5 | 5 | 5 | 5 | 5 | 5 | 5 | 5 | 5 | 5 |

TABLE 1-continued

Vulcaniazable Nitrile Rubber Composition

|  | Example | | | | Comparative Example | | | | | |
| --- | --- | --- | --- | --- | --- | --- | --- | --- | --- | --- |
|  | 1 | 2 | 3 | 4 | 1 | 2 | 3 | 4 | 5 | 6 |
| Stearic acid | 1 | 1 | 1 | 1 | 1 | 1 | 1 | 1 | 1 | 1 |
| Carbon black SRF | 60 | — | — | — | 60 | 60 | 60 | — | — | — |
| Carbon black thermax MT | — | 40 | 40 | 40 | — | — | — | 40 | 40 | 40 |
| Nipsil VN-3 *3 | — | 15 | 15 | 15 | — | — | — | 15 | 15 | 15 |
| Plasticizer (DOP) *4 | 15 | 15 | 15 | 15 | 15 | 15 | 15 | 15 | 15 | 15 |
| Magnesium oxide | 10 | 15 | 15 | 15 | 10 | 10 | 10 | 15 | 15 | 15 |
| Aging stabilizer *5 | 2 | 2 | 2 | 2 | 2 | 2 | 2 | 2 | 2 | 2 |
| Paraffin wax *6 | — | 2 | 2 | 2 | — | — | — | 2 | 2 | 2 |
| Dicumyl peroxide | 2 | 2 | 2 | 2 | 2 | 2 | 2 | 2 | 2 | 2 |
| Calcium hydroxide | 2.5 | 2.5 | 2.5 | 2.5 | 10 | 10 | 10 | 10 | 10 | 10 |
| Dibenzothiazyl disulfide | — | — | — | — | 2 | — | — | 2 | — | — |
| N-cylcohexyl-2-benzothiazyl-sulfenamide | — | — | — | — | — | 2 | — | — | 2 | — |
| N-oxyethylene-2-benzothiazyl-sulfenamide | — | — | — | — | — | — | 2 | — | — | 2 |
| Diphenylguanidine | 3 | 3 | — | — | — | — | — | — | — | — |
| Hexamethylenetetramine | — | — | 3 | — | — | — | — | — | — | — |
| Basic vulcanization accelerator *7 | — | — | — | 3 | — | — | — | — | — | — |
| Organic phosphonium salt *8 | 1 | 1 | 1 | 1 | 3 | 3 | 3 | 3 | 3 | 3 |

*1 Nipol DN207, supplied by Nippon Zeon Co., bound nitrile content = 33.5%
*2 Nipol 1203J, supplied by Nippon Zeon Co., bound nitrile content 33.5%, NBR/polyvinyl chloride = 70/30
*3 Wet process silica
*4 Dioctyl phthalate, supplied by Daihachi Chem. Co.
*5 Nocrac #224, supplied by Ohuchi Shinko K.K.
*6 Santaito S
*7 n-Butylaldehyde/aniline reaction product
*8 Tetrabutylphosphonium benzotriazolate

TABLE 2

Vulcanizable Fluororubber Composition

| Ingredient | Amount (parts) |
| --- | --- |
| Fluororubber *9 | 100 |
| Magnesium oxide | 3 |
| Calcium oxide | 6 |
| Carbon black (MT) | 20 |
| Technoflon $M_1$ *10 | 3.6 |
| Technoflon $M_2$ *11 | 1.6 |

*9 Technoflon TN50 supplied by Ausimont Co.
*11 Polyol vulcanization accelerator supplied by Montefros Co.
*12 Polyol vulcanization accelerator supplied by Montefros Co.

TABLE 3

Properties of Vulcanized NBR Composition and Evaluation of Adhesion of Laminate

|  | Example | | | | Comparative Example | | | | | |
| --- | --- | --- | --- | --- | --- | --- | --- | --- | --- | --- |
|  | 1 | 2 | 3 | 4 | 1 | 2 | 3 | 4 | 5 | 6 |
| Properties of vulcanized NBR | | | | | | | | | | |
| Mooney scorch (145° C.) t5 (min) | 6.8 | 7.8 | 7.3 | 6.88 | 10.6 | 10.1 | 10.2 | 10.1 | 10.0 | 10.1 |
| Tensile test (160° C., 30 min) | | | | | | | | | | |
| Tensile strength (kgf/cm$^2$) | 190 | 122 | 118 | 111 | 185 | 180 | 190 | 101 | 105 | 101 |
| Elongation (%) | 650 | 620 | 620 | 710 | 700 | 710 | 670 | 670 | 660 | 680 |
| Hardness (JIS A) | 63 | 67 | 70 | 66 | 62 | 61 | 68 | 68 | 68 | 67 |
| Heat aging test (100° C., 70 hrs) | | | | | | | | | | |
| Elongation change (%) | −28 | −39 | −38 | −39 | −40 | −42 | −40 | −55 | −54 | −53 |
| Hardness (%) | +4 | +6 | +5 | +7 | +12 | +11 | +10 | +11 | +10 | +12 |
| Permanent set (100° C., 70 hrs) (%) | 31 | 40 | 42 | 44 | 73 | 78 | 77 | 81 | 78 | 80 |
| Evaluation of Rubber Laminate | | | | | | | | | | |

TABLE 3-continued

Properties of Vulcanized NBR Composition
and Evaluation of Adhesion of Laminate

|  | Example | | | | Comparative Example | | | | | |
|---|---|---|---|---|---|---|---|---|---|---|
|  | 1 | 2 | 3 | 4 | 1 | 2 | 3 | 4 | 5 | 6 |
| Peeling test |  |  |  |  |  |  |  |  |  |  |
| Bond strength (kgf/cm) | 5.2 | 5.4 | 5.1 | 5.0 | 4.6 | 4.5 | 4.5 | 4.4 | 4.5 | 4.4 |
| Broken state* | CF | CF | CF | CF | CF | CF | CF | CF | CF | CF |

*CF: Cohesive failure

TABLE 4

|  | Example | | | |
|---|---|---|---|---|
|  | 5 | 6 | 7 | 8 |
| Polyblend | 100 | 100 | 100 | 100 |
| Zinc oxide | 1 | 1 | 1 | 1 |
| Stearic acid | 1 | 1 | 1 | 1 |
| Carbon black thermacs MT | 40 | 40 | 40 | 40 |
| Carbon black Seast SO | 15 | 15 | 15 | 15 |
| Plasticizer | 15 | 15 | 15 | 15 |
| Aging stabilizer | 2 | 2 | 2 | 2 |
| Paraffin wax | 2 | 2 | 2 | 2 |
| Dicumyl peroxide | 3 | 3 | 3 | 3 |
| Diphenylguanidine | 3 | 3 | 3 | 3 |
| Tetrabutylphosphonium benzotriazolate | 3 | 3 | 3 | 3 |
| Magnesium oxide | 2 | 2 | 1.5 | 15 |
| Calcium hydroxide | 1.5 | 1 | — | 5 |
| Physical Properties |  |  |  |  |
| Mooney scorch (145° C.) t5 (min) | 6.9 | 7.5 | 7.3 | 6.7 |
| Tensile test (160° C., 30 min) |  |  |  |  |
| Tensile strength (kgf/cm$^2$) | 163 | 160 | 166 | 155 |
| Elongation (%) | 350 | 370 | 360 | 360 |
| Hardness (JIS A) | 61 | 60 | 59 | 59 |
| Heat aging test (100° C., 72 hr) Change in elongation (%) | −16 | −16 | −8 | −22 |
| Permanent set (100° C., 70 hr) Permanent set (%) | 36 | 37 | 37 | 40 |
| Low temperature impact brittleness test Brittleness temperature (°C.) | −20.2 | −23.8 | −25.0 | −17.4 |
| Peeling Test of Rubber Laminate |  |  |  |  |
| Bond strength (kgf/cm$^2$) | 4.3 | 4.6 | 4.6 | 4.3 |
| Broken state* | CF | CF | CF | CF |

*CF Cohesive failure

Industrial Applicability

A rubber laminate made by adhering the vulcanizable fluororubber composition layer and the vulcanizable nitrile rubber composition layer of the vulcanizable rubber composition laminate of the present invention to each other under vulcanizing conditions is characterized as having a firm adhesion between the fluororubber layer and the nitrile rubber layer, and excellent properties inherently possessed by the fluororubber, such as thermal resistance, oil resistance, solvent resistance and chemical resistance. As the fluororubber/nitrile rubber laminate contains the nitrile rubber layer, the cold resistance is high and is advantageous from cost consideration. Further, as the fluororubber/nitrile rubber laminate contains the fluororubber layer, it also exhibits excellent gasoline resistance and sour-gasoline resistance, and therefore is valuable as a material for fuel hoses and diaphragms. Further, the rubber laminate is widely used for rubber parts for which an oil resistance and chemical resistance are required. When a polyblend is incorporated in the nitrile rubber composition layer, the fluororubber/nitrile rubber laminate is valuable as an outer layer material of a fuel hose.

We claim:

1. A laminate of vulcanizable rubber composition layers, which comprises (i) a layer of a vulcanizable fluororubber composition comprising a fluororubber and a metal oxide and (ii) a layer of a vulcanizable nitrile rubber composition consisting essentially of a nitrile rubber, an organic phosphonium salt represented by the following formula (1), an organic peroxide crosslinking system, and an organic basic vulcanization accelerator:

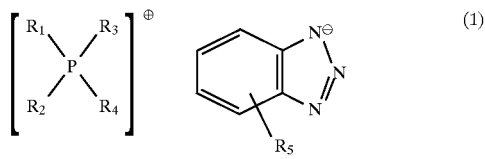

wherein $R_1$, $R_2$, $R_3$ and $R_4$ each represents a hydrocarbon group having 1 to 20 carbon atoms, which may have a substituent, and no more than three of $R_1$, $R_2$, $R_3$ and $R_4$ may be a primary, secondary or tertiary amino group or a fluoroalkyl group; and $R_5$ represents hydrogen or an alkyl group having 1 to 20 carbon atoms.

2. A laminate of vulcanizable rubber composition layers, as claimed in claim 1, wherein the vulcanizable nitrile rubber composition layer consists essentially of 100 parts by weight of a nitrile rubber, 0.5 to 1.0 parts by weight of the organic phosphonium salt, and 0.5 to 15 parts by weight an organic peroxide curing system.

3. A laminate of vulcanizable rubber composition layers, as claimed in claim 1, wherein the vulcanizable nitrile rubber composition layer consists essentially of 100 parts by weight of a nitrile rubber, 0.5 to 10 parts by weight of the organic phosphonium salt, 0.5 to 1.5 parts by weight an organic peroxide curing system, and 0.1 to 5 parts by weight of an organic basic vulcanization accelerator.

4. A laminate of vulcanizable rubber composition layers, as claimed in any of claims 1 to 3, wherein the unsaturated nitrile-conjugated diene copolymer rubber is an acrylonitrile-butadiene copolymer having an acrylonitrile content of 20 to 60% by weight and a Mooney viscosity of 20 to 95.

5. A laminate of vulcanizable rubber composition layers, as claimed in any of claims 1 to 3, wherein the organic phosphonium salt is tetrabutylphosphonium benzotriazolate.

6. A laminate of vulcanizable rubber composition layers, as claimed in any of claims 1 to 3, wherein the organic peroxide crosslinking system comprises a combination of an organic peroxide with trimethylolpropane trimethacrylate or triallyl isocyanurate.

7. A laminate of vulcanizable rubber composition layers, as claimed in any of claims 1 to 3, wherein the organic basic vulcanization accelerator is selected from the group consisting of an aldehyde-ammonia organic vulcanization accelerator, an aldehyde-amine organic vulcanization accelerator, and a guanidine organic vulcanization accelerator.

8. A laminate of vulcanizable rubber composition layers, as claimed in any of claims 1 to 3, wherein the organic basic vulcanization accelerator is a guanidine organic vulcanization accelerator.

9. A laminate of vulcanizable rubber composition layers, as claimed in any of claims 1 to 3, wherein the organic basic vulcanization accelerator is diphenylguanidine.

10. A laminate of vulcanizable rubber composition layers, as claimed in any of claims 1 to 3, wherein the vulcanizable nitrile rubber composition comprises less than 5 parts by weight, based on 100 parts by weight of the nitrile rubber, of an oxide or hydroxide of at least one metal selected from those of group 2 to group 4 of the periodic table.

11. A laminate of vulcanizable rubber composition layers, as claimed in claim 10, wherein the metal oxide or hydroxide is at least one selected from the group consisting of magnesium oxide, zinc oxide, aluminum oxide, zinc dioxide, calcium oxide, trilead tetroxide, calcium hydroxide and aluminum hydroxide.

12. A laminate of vulcanizable rubber composition layers, as claimed in any of claims 1 to 3, wherein the vulcanizable fluororubber composition layer comprises 100 parts by weight of a fluororubber and 1 to 30 parts by weight of a metal oxide.

13. A laminate of vulcanizable rubber composition layers, as claimed in any of claims 1 to 3, wherein the fluororubber is a copolymer of vinylidene fluoride with hexafluoropropylene or a terpolymer of vinylidene fluoride with hexafluoropropylene and tetrafluoroethylene.

14. A laminate of vulcanizable rubber composition layers, as claimed in any of claims 1 to 3, wherein the metal oxide in the vulcanizable fluororubber composition is an oxide of a metal selected from metals of group 2A, group 3B and group 4B of the periodic table.

15. A laminate of vulcanizable rubber composition layers, as claimed in any of claims 1 to 3, wherein the metal oxide in the vulcanizable fluororubber composition is an oxide of a metal of group 2A of the periodic table.

16. A laminate of vulcanizable rubber composition layers, as claimed in any of claims 1 to 3, wherein the metal oxide in the vulcanizable fluororubber composition is magnesium oxide.

17. A process for producing a rubber laminate which comprises vulcanizing and adhering together the vulcanizable rubber composition layers in the laminate as described in any of claims 1 to 3.

18. A rubber laminate produced by the process as described in claim 17.

19. A material for a fuel hose which comprises the rubber laminate as claimed in claim 18.

20. A material for a diaphragm which comprises the rubber laminate as claimed in claim 18.

21. A fuel hose made of the rubber laminate as claimed in claim 18.

22. A diaphragm made of the rubber laminate as claimed in claim 18.

23. A laminate of vulcanizable rubber composition layers, which comprises (i) a layer of a vulcanizable fluororubber composition comprising a fluororubber and a metal oxide and (ii) a layer of a vulcanizable nitrile rubber composition consisting essentially of
  a nitrile rubber blend which is a mixture of a copolymer rubber of an unsaturated nitrile monomer with a conjugated diene monomer and a polyvinyl chloride resin,
  an organic phosphonium salt represented by the following formula (1),
  an organic peroxide crosslinking system, and
  an organic basic vulcanization accelerator:

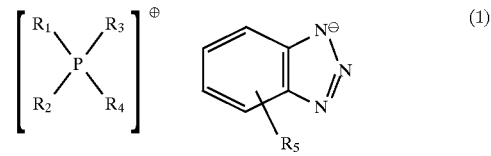

wherein $R_1$, $R_2$, $R_3$ and $R_4$ each represents a hydrocarbon group having 1 to 20 carbon atoms, which may have a substituent, and no more than three of $R_1$, $R_2$, $R_3$ and $R_4$ may be a primary, secondary or tertiary amino group or a fluoroalkyl group; and $R_5$ represents hydrogen or an alkyl group having 1 to 20 carbon atoms.

24. A laminate of vulcanizable rubber composition layers, as claimed in claim 23, wherein the vulcanizable nitrile rubber composition layer consists essentially of 100 parts by weight of said nitrile rubber blend, 0.5 to 10 parts by weight of the organic phosphonium salt, and 0.5 to 15 parts by weight of an organic peroxide curing system.

25. A laminate of vulcanizable rubber composition layers, as claimed in claim 23, wherein the vulcanizable nitrile rubber composition layer consists essentially of 100 parts by weight of said nitrile rubber blend, 0.5 to 10 parts by weight of the organic phosphonium salt, 0.5 to 15 parts by weight of an organic peroxide curing system, and 0.1 to 5 parts by weight of an organic basic vulcanization accelerator.

26. A laminate of vulcanizable rubber composition layers, as claimed in any of claims 23 to 25, wherein the mixture of the unsaturated nitrile-conjugated diene copolymer rubber and a polyvinyl chloride resin is a mixture of 95 to 50 parts by weight of the unsaturated nitrile-conjugated diene copolymer rubber and 5 to 50 parts by weight of a polyvinyl chloride resin.

* * * * *